(12) United States Patent
Wollmann et al.

(10) Patent No.: US 9,663,270 B2
(45) Date of Patent: May 30, 2017

(54) APPARATUS FOR LASER TRANSMISSION WELDING, METHOD FOR LASER TRANSMISSION WELDING, AND A RECEPTACLE WHICH IS PRODUCED THEREBY AND IS CLOSED BY SHEET

(71) Applicant: JENOPTIK Automatisierungstechnik GmbH, Jena (DE)

(72) Inventors: Werner Wollmann, Jena (DE); Christoph Steiner, Jena (DE); Wilfried Kraemer, Jena (DE); Norbert Krzyzaniak, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 467 days.

(21) Appl. No.: 14/174,426

(22) Filed: Feb. 6, 2014

(65) Prior Publication Data
US 2014/0217103 A1 Aug. 7, 2014

(30) Foreign Application Priority Data
Feb. 7, 2013 (DE) .................... 10 2013 101 224

(51) Int. Cl.
*B29C 65/16* (2006.01)
*B65D 25/04* (2006.01)
(Continued)

(52) U.S. Cl.
CPC .............. *B65D 25/04* (2013.01); *B29C 65/16* (2013.01); *B29C 65/1635* (2013.01); *B29C 65/1654* (2013.01); *B29C 65/1664* (2013.01); *B29C 65/1674* (2013.01); *B29C 66/118* (2013.01); *B29C 66/242* (2013.01); *B29C 66/24221* (2013.01); *B29C 66/53461* (2013.01); *B29C 66/73921* (2013.01); *B29C 66/8322* (2013.01);
(Continued)

(58) Field of Classification Search
CPC ............ B21D 51/2653; B21D 51/2661; B29C 65/1635; B29C 65/1654; B29C 65/1658; B29C 66/242; B29C 66/24221; B29C 66/53461; B29C 66/63462; B29C 65/1667
See application file for complete search history.

(56) References Cited

U.S. PATENT DOCUMENTS 5,049,720 A * 9/1991 Fang ...................... B23K 26/12
219/121.63
5,125,780 A * 6/1992 Budenbender ....... B23K 33/008
219/121.64
(Continued)

FOREIGN PATENT DOCUMENTS

DE 10 2007 042 739 A1 10/2008
DE 10 2011 005 683 A1 9/2012
(Continued)

OTHER PUBLICATIONS

Machine translation of Lemouzy, FR 2810014, May 30, 2016.*

*Primary Examiner* — Edward Tolan
(74) *Attorney, Agent, or Firm* — Duane Morris LLP (57) ABSTRACT

A method for producing a receptacle which is closed by a sheet by transmission laser welding, and to an apparatus suitable to carry out same. The method and the apparatus are configured in such a way that a weld seam is formed between the wall structure of the receptacle and the sheet so as to be wider than the end faces of the wall structure.

2 Claims, 5 Drawing Sheets

(51) Int. Cl.
*B21D 51/26* (2006.01)
*B29L 31/00* (2006.01)
*B29L 22/00* (2006.01)
*B29C 65/78* (2006.01)
*B29C 65/00* (2006.01)

(52) U.S. Cl.
CPC ...... *B21D 51/2653* (2013.01); *B29C 65/1616* (2013.01); *B29C 65/1658* (2013.01); *B29C 65/7858* (2013.01); *B29C 66/112* (2013.01); *B29C 66/114* (2013.01); *B29C 66/1182* (2013.01); *B29C 66/81268* (2013.01); *B29C 66/8432* (2013.01); *B29K 2995/0027* (2013.01); *B29L 2022/007* (2013.01); *B29L 2031/712* (2013.01)

(56) References Cited

U.S. PATENT DOCUMENTS

| | | | | |
|---|---|---|---|---|
| 5,186,592 | A * | 2/1993 | Budenbender | B23K 26/206 219/121.64 |
| 5,704,512 | A * | 1/1998 | Falk | B29C 66/24221 220/501 |
| 8,349,420 | B2 * | 1/2013 | Shinozaki | B23K 26/206 156/272.8 |
| 8,357,875 | B2 * | 1/2013 | Ehrmann | B29C 65/1635 219/121.63 |
| 8,415,583 | B2 | 4/2013 | Brunnecker et al. | |
| 8,759,711 | B2 * | 6/2014 | Wollmann | B23K 26/023 219/121.63 |
| 8,981,256 | B2 * | 3/2015 | Stein | B29C 65/1687 156/380.9 |
| 2004/0095444 | A1 | 5/2004 | Drummond et al. | |
| 2005/0145330 | A1 | 7/2005 | Shubinsky et al. | |
| 2005/0191472 | A1 * | 9/2005 | Oonishi | G01P 1/023 428/200 |
| 2006/0186095 | A1 * | 8/2006 | Kan | B23K 26/0734 219/121.67 |
| 2007/0131639 | A1 * | 6/2007 | Nakaya | B29C 65/1654 215/232 |
| 2012/0187133 | A1 * | 7/2012 | Landman | B29B 11/14 220/610 |

FOREIGN PATENT DOCUMENTS

| | | | |
|---|---|---|---|
| DE | 10 2011 055 203 A1 | 5/2013 | |
| FR | 2810014 A1 * | 12/2001 | ............ B65B 7/01 |
| GB | 2 120 200 A | 11/1983 | |
| JP | 2011-51627 A * | 3/2011 | ............ B65D 43/14 |
| JP | 2013-001432 A * | 1/2013 | ............ B65D 77/20 |
| JP | 2013/146190 A1 * | 10/2013 | ........ B29C 65/1654 |
| WO | WO 97/12808 A1 | 4/1997 | |

* cited by examiner

APPARATUS FOR LASER TRANSMISSION WELDING, METHOD FOR LASER TRANSMISSION WELDING, AND A RECEPTACLE WHICH IS PRODUCED THEREBY AND IS CLOSED BY SHEET

RELATED APPLICATIONS

The present application claims priority benefit of German Application No. DE 10 2013 101 224.8 filed on Feb. 7, 2013, the contents of which are incorporated by reference in its entirety.

FIELD OF THE INVENTION

The invention is directed to an apparatus for laser transmission welding, a method for laser transmission welding and a receptacle which is produced thereby and is closed by a sheet.

BACKGROUND OF THE INVENTION

Generally, in laser transmission welding two workpiece parts are connected to one another. For this purpose, the two workpiece parts must directly contact in the joining region so that they can be welded. One of the workpiece parts is transmissive for the laser radiation and faces the laser source during welding. The other workpiece part is absorptive for the laser radiation. The laser beams penetrate the transmissive workpiece part and are converted into heat energy in the upper layers of the absorptive workpiece part. The upper layers of the absorptive workpiece part are fused which, due to heat conduction, also brings about a fusing of the adjoining layers of the transmissive workpiece part. The two melts can merge with each other and bond the two workpiece parts in cooled condition by means of a weld to form a welded workpiece.

For the weld to form homogeneously and with high strength, it must be ensured that the process of heat conduction can take place without interruption over the course of the weld seam. This requires direct contact between the workpiece parts in the joining region. Contact can be produced in a highly reliable manner by pressing the two workpiece parts against one another by suitable devices during welding.

A clamping device disclosed in Laid Open Application DE 10 2007 042 739 A1 is used for laser transmission welding to press a transmissive lid onto a housing-like bottom part. The absorptive bottom part has an opening which must be closed by the exactly fitting lid. To this end, the plane edge of the lid lies on the edge of the opening. The edges lying one on top of the other form the joining region and are to be joined by a circumferential weld. In order to apply a pressing force in the joining region, a pressing body (in this case, clamp chucks) is placed on the lid within the circumferential weld seam. The shape of the pressing body is adapted to the shape of the lid so that its contact surface reaches as close as possible to the joining region and the pressing force can be introduced so as to be evenly distributed in the lid.

The pressing body is connected via four connecting struts to an annular carrier (in this case, clamping ring) of the device, this carrier being guided outwardly around the circumferential weld seam. The pressing force is transmitted from the carrier to the pressing body via the connecting struts. An intermediate space remains between the carrier and the pressing body through which the laser beam can be directed along the weld seam onto the workpiece. The intermediate space is interrupted only by the connecting struts. The cross section of the connecting struts is as small as possible so as to minimize shadowing of the laser beams. The laser beam is guided circumferentially along the weld seam by a scanner system or by a movable welding head.

In an embodiment of the device, the pressing of the lid by means of the pressing body inside the weld seam is combined with a clamping element additionally fastened to the carrier outside of the weld seam. This assumes that there will still be sufficient application surface at the edge of the lid for applying the clamping element. A weld seam which connects the lid to the bottom part up to the outermost edge is thus no longer possible.

This device is disadvantageous in that, in order to introduce the pressing force, it requires a suitable, stable and, therefore, specially fabricated lid which must be exactly aligned and fitted on either manually or by handling devices. The device is not intended, nor is it suitable, for handling a lid comprising thin sheet.

It must be assumed based on the construction that the clamping device is preferably used on small workpieces with simple weld seams. With workpieces in which the laser beam must be guided over long weld seams or over a number of winding weld seams, the machining time for feeding the laser increases appreciably. In workpieces having a plurality of adjacent circumferential weld seams, a corresponding quantity of pressing bodies would also be required. Attaching the pressing bodies by means of a corresponding quantity of connecting struts would require considerable effort and would inevitably either result in increased shadowing of the laser beam or the clamping device would be too unstable to transmit pressing forces.

In a device for through-transmission welding of two flat workpiece parts in the not-prior-published document DE 10 2011 055 203.0, these drawbacks are avoided by gluing the pressing bodies to a transparent carrier plate. This greatly facilitates the mounting of pressing bodies at the carrier plate, including pluralities of pressing bodies and pressing bodies of different shapes. The carrier plate is transparent to the laser radiation so that it can impinge on the workpiece through the intermediate spaces remaining between the pressing bodies without being interrupted by connecting struts. The carrier plate can be adapted very easily to different pressing forces or workpiece sizes by appropriate dimensioning of the carrier plate. The laser radiation source is a linear array which is composed of individually controllable diode laser emitters and which can emit the laser radiation onto the workpiece in the shape of a closed line when needed. Complete welding requires only a complete relative movement between the workpiece and the laser radiation source. Accordingly, only a very short time is needed to weld the entire workpiece. In areas which are not to be welded, either the corresponding diode laser emitters are switched off or the workpiece parts are covered by the pressing bodies.

The device is also suitable for welding sheets to absorptive workpiece parts with a shell-like construction and with thin wall structures standing upright in Z direction. To this end, the sheet is held by its edges and pre-loaded in X direction and Y direction. Pre-loaded in this way, it is then laid upon the shell-shaped workpiece part accompanied by light pressing force so that the end faces of the wall structures facing in Z direction contact the sheet. The welding process is then carried out.

During welding, the end faces of the wall structures are joined to the sheet. For this purpose, at least one outer pressing body and one inner pressing body are positioned at the level of the sheet on both sides of the end faces, but without exerting pressure on the sheet in Z direction. The pressing bodies which are oriented substantially perpendicular to the sheet form a defined intermediate space between the inner pressing body and outer pressing body through which the laser beam is guided onto the end faces. The intermediate space is formed in direction of the laser beam with the necessary length for homogenizing a laser beam entering in a divergent manner into the intermediate space by means of multiple reflections at the walls of the pressing bodies. The homogenized laser beam impinges on the end face and forms a two-dimensional weld seam. The homogenization achieves a strength which would not be possible with conventional laser transmission welding methods even in thin wall structures with correspondingly small end faces.

However, because the sheet is tensioned in X direction and Y direction, the device described in the not-prior-published DE 10 2011 055 203.0 is only able to compensate for tolerances in the planarity of the end walls of the absorptive workpiece part to a limited extent.

Further, for certain applications of shell-like workpieces such as receptacles, for example, it is of particular interest that the wall structures of the receptacle be as thin as possible. An example of such an application is a heat exchanger in which the heat transfer is to be carried out via very thin inner dividing walls or via the thin sheet serving to close the receptacle opening. However, it would be impossible to weld even thinner wall structures because if the end face were any smaller it would no longer be possible to achieve adequate strength in the weld seam.

SUMMARY OF THE INVENTION

It is the object of the invention to provide an apparatus which allows a sheet which is provided as a cover of a receptacle opening and which has a low sensitivity to tolerances of the wall structure to be welded to slender end faces of very thin wall structures of a receptacle and, in so doing, to achieve a weld seam with high strength.

A further object of the invention is to provide a method in which a sheet which is provided as a cover of a receptacle opening can be welded to very thin-walled wall structures of a receptacle with high strength.

A further object of the invention is to provide a receptacle which can be closed by sheet and in which a strength of the weld seam which is comparable or higher (compared to the prior art) can be achieved with minimal expenditure on material while improving the mechanical protection of the sheet closing a receptacle opening.

According to the invention, the above-stated objects are met for an apparatus according to claim 1, for a method according to claim 6 and for a receptacle according to claim 8. Advantageous embodiments will be apparent from the respective dependent claims.

BRIEF DESCRIPTION OF THE DRAWINGS

The invention will be described more fully in the following with reference to embodiment examples. The accompanying drawings show.

DESCRIPTION OF THE EMBODIMENTS OF THE INVENTION

Figure 1:
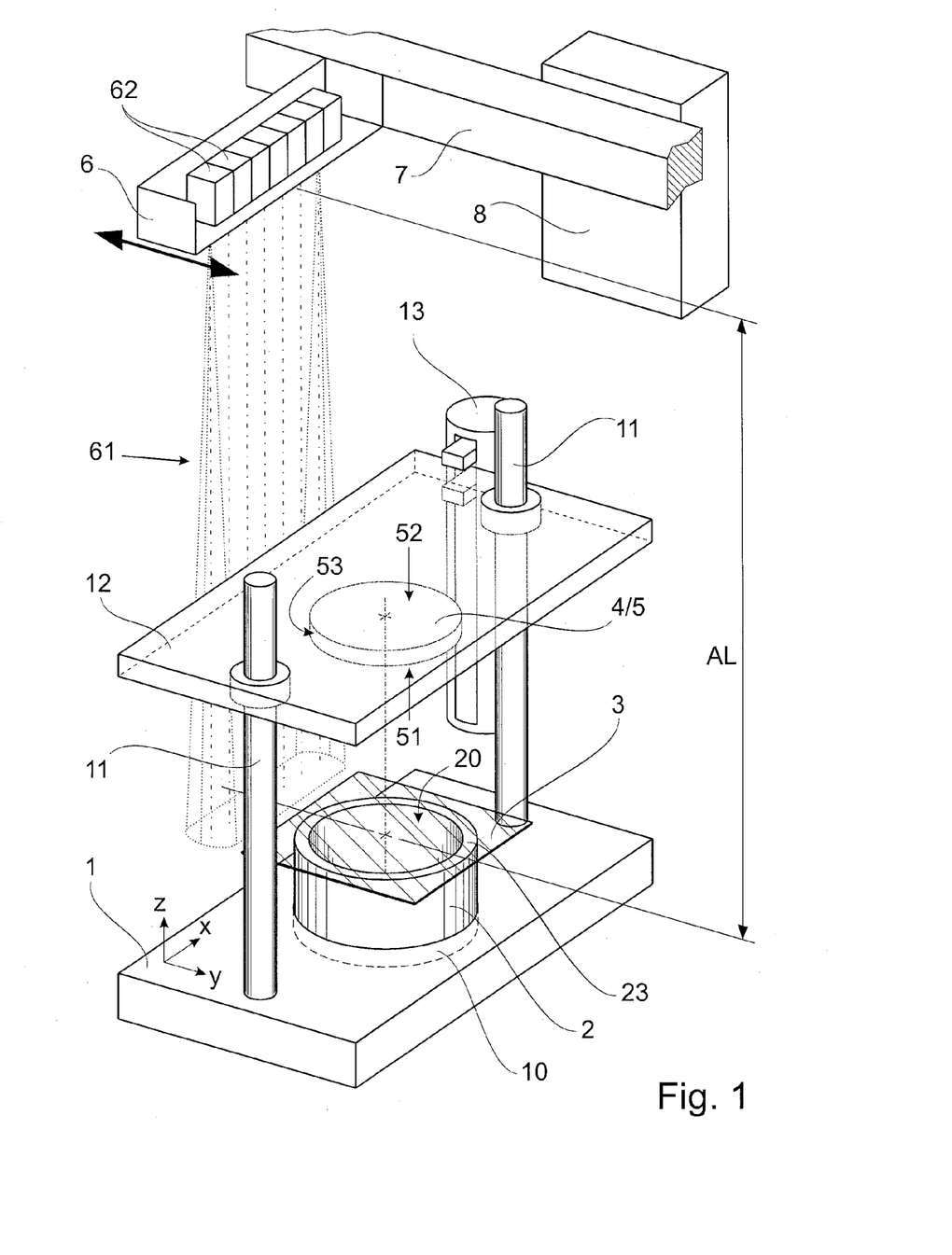
FIG. 1 is an overview of the apparatus.

According to a first embodiment example shown in FIG. 1, an apparatus for laser transmission welding substantially has a holder 1, a laser radiation source 6, a movement device 7, a storage-and-control unit 8, and a carrier plate 12 with at least one pressing unit 4. The holder 1 is configured to position an open receptacle 2 in directions in perpendicular relationship to one another, i.e., the X direction, a Y direction and the Z direction, relative to a laser beam 61 which is directed to the holder 1 in Z direction and which proceeds from the laser radiation source 6. The laser radiation source 6 is arranged at the movement device 7 so as to be movable relative to the holder 1 in Y direction. The apparatus has a storage-and-control unit 8 for spatially resolved actuation of the laser radiation source 6 in X direction and Y direction and for controlling the movement device 7. The transparent carrier plate 12 is arranged between the holder 1 and the laser radiation source 6 and has at the side facing the holder 1 the pressing unit 4 comprising at least one pressing body 5. For carrying out a relative movement in Z direction, the holder 1 and the carrier plate 12 are movably connected to one another and the carrier plate 12 is moved in Z direction by means of a drive 13.

The holder 1 is a stable plate which is dimensioned in conformity to the size of the receptacle 2 to be received and has a rectangular footprint. The holder 1 has positioning means 10 well known in the art, such as stops, molded recesses or suitable clamping means, for receiving the receptacle 2.

The apparatus is suitable for welding the open receptacle 2 by means of laser transmission welding. A receptacle 2 of this type is formed by a wall structure having end faces and wall surfaces and comprising a material which absorbs the laser radiation 61. The wall structure encloses at least one cavity 26 with a cross-sectional area. The cross-sectional area defined by the wall structure forms a receptacle opening 20 which is to be closed by a material which is transparent to the laser radiation 61 and which is in the form of a sheet 3.

To simplify the description of the first embodiment example, it will be assumed that the receptacle 2 is a cup-shaped receptacle with circular cross-sectional area. In this case, the wall structure is a hollow cylinder, one end thereof being closed by a base and the other end thereof having the receptacle opening 20 which likewise has a circular cross-sectional area. The inner side of the hollow cylinder forms an inner wall surface 24 of the wall structure and the outer side forms an outer wall surface 25 of the wall structure. At the end of the receptacle opening 20, the wall structure forms an end face 23 with an end face width SB between the two wall surfaces 24 and 25.

The receptacle 2 which is held in the holder 1 is positioned such that the end face 23 faces the laser radiation source 6, and a radiating length AL adapted to the characteristics of the laser radiation source 6 is adjusted between the end face 23 and laser radiation source 6 in Z direction.

The laser radiation source 6 comprises a plurality of individually controllable laser emitters 62 which are arranged adjacently in X direction and which collectively form a linear array. Laser emitters 62 emitting the laser radiation 61 in a wavelength range between 800 and 1600 nm are preferably used. The spatially resolved control of the individual laser emitters 62 is carried out by means of the storage-and-control unit 8.

The laser radiation 61 emerging from the laser radiation source 6 forming the linear array is generally divergent. The radiating length AL between the laser radiation source 6 and the end face 23 of the receptacle 2 is adjusted in such a way that the laser radiation 61 exiting from the individual laser emitters 62 partially overlaps the end face 23. When all laser emitters 62 are operating simultaneously, the laser radiation 61 is projected on to the end face 23 in the form of a closed laser line oriented in X direction.

The laser radiation source 6 is fixedly connected to the movement device 7. A relative movement between the holder 1 and the laser radiation source 6 is carried out by the movement device 7. The relative movement takes place in Y direction in a movement range which allows the entire end face 23 of the receptacle 2 to be impinged one time by the laser line during the relative movement. The control of the relative movement is carried out by means of the storage-and-control unit 8. As concerns laser transmission welding, it is immaterial whether it is the laser radiation source 6 and/or the holder 1 that is moved for the relative movement. The holder 1 could also be moved in Y direction by the movement device 7.

The carrier plate 12 is a glass plate which is oriented substantially perpendicular to the laser radiation 61 traveling in Z direction and which is transparent to the laser radiation 61. It is arranged above the receptacle 2 positioned in the holder 1 and has a size corresponding to the holder 1. The carrier plate 12 is movably connected to the holder 1. For this purpose, the carrier plate 12 is received at two linear guides 11 which are secured to the holder 1 and allow a translatory movement of the carrier plate 12 in Z direction and a bearing support in X direction and Y direction that is free from play. The linear guides 11 are arranged at the edge of the holder 1 and the carrier plate 12 so as not to interfere with the holding and positioning of the receptacle 2. The translatory movement of the carrier plate 12 is carried out by the drive 13.

The pressing unit 4 is fastened to an underside of the carrier plate 12 directed toward the holder 1. The fastening is advantageously carried out by means of a glue connection. Any other kind of fastening can also be used provided that the connection is resistant to laser radiation 61 and the fastening does not mask the receptacle 2 from the laser radiation 61.

The thickness of the transparent carrier plate 12 is correspondingly adapted to afford the carrier plate 12, depending on the dimensions of the apparatus, a corresponding stability for fastening and carrying the pressing unit 4, for fastening the linear guides 11 and for applying the movement forces and pressure forces.

In this embodiment example, the pressing unit 4 has only one pressing body 5. The pressing body 5 is a profiled body with two parallel terminating surfaces 51 and with a lateral surface 53 surrounding the profile of the pressing body 5. The pressing body 5 is fastened to the carrier plate 12 at one of the terminating surfaces 51 by means of a glue connection. Therefore, this terminating surface 51 will be referred to hereinafter as glued surface 52. The profile of the pressing body 5 is formed in conformity to the cross-sectional area of the receptacle opening 20. Since the cross-sectional area of the receptacle opening 20 of the cup-shaped receptacle 2 described above is circular, the pressing body 5 accordingly has a cylindrical shape with a circular terminating surface 51 which faces the holder 1 and which is aligned parallel to the end face 23 of the receptacle 2.

The pressing body 5 is made of an opaque material. The opaque material has the advantage that any contents in the receptacle 2 are protected from the laser radiation 61.

The pressing body 5 can also be made of a transparent material in principle. A transparent material permits a deeper penetration of the laser radiation 61 into the receptacle opening 20 compared to the opaque material. By means of the spatially resolved controlling of the laser radiation source 6 in X direction and Y direction, it is possible to limit impingement of the laser radiation 61 largely to the end faces 23.

During a welding process, the laser radiation source 6 is guided by the movement device 7 in Y direction over the end face 23. The laser radiation 61 penetrates the transparent carrier plate 12 and impinges on all places on the end face 23 of the receptacle 2 that are not concealed by the pressing body 5.

As a result of the glued connection between pressing body 5 and carrier plate 12, a weld seam 28 can be formed free from discontinuities during the welding process because no brackets or other holding means are required for fastening the pressing body 5. During the relative movement, the laser emitters 62 are operated only at the X and Y positions at which they are in opposing relationship to the end face 23 of the receptacle 2. This makes the apparatus more energy-efficient and prevents heating of parts of the apparatus and additional stress on the wall structures of the receptacle 2.

The pressing body 5 is used to press the sheet 3 into the receptacle opening 20 in Z direction, this sheet 3 lying flat on the end face 23 during the welding process for closing the receptacle opening 20. In order to press the sheet into the receptacle opening 20, the pressing body 5 is fastened to the carrier plate 12 in such a way that the profile of the pressing body 5 is exactly aligned with the holder 1 in X direction and Y direction and accordingly also with the cross section of the receptacle opening 20 of the receptacle 2 positioned in the holder 1. When the receptacle 2 is cup-shaped, the circular terminating surface 51 of the pressing body 5 is aligned exactly with respect to the center of the receptacle opening 20.

Further, the profile and therefore the terminating surface 51 of the pressing body 5 is always smaller than the cross-sectional area of the receptacle opening 20 by at least twice the sheet thickness FD so that at least one gap 32 corresponding to the sheet thickness FD remains between the pressing body 5 and the inner wall surface 24. The laser radiation 61 can also impinge on the inner wall surfaces 24 through this gap 32 in an edge region 33 directly adjoining the end faces 23.

The pressing-in is carried out to a press-in depth ET corresponding approximately to the end face width SB. To this end, the pressing body 5 is moved by the translatory movement of the carrier plate 12 along the linear guides 11 into the receptacle opening 20 until the terminating surface 51 of the pressing body 5 is located below the end face 23 of the receptacle 2 at the corresponding press-in depth ET. To achieve the press-in depth ET, the height of the pressing body 5 (distance between terminating surface 51 and glued surface 52) must be at least as large as the desired press-in depth ET. Because end face widths SB are generally in the range of <10 mm, the height of the pressing body 5 is also very low.

The translatory movement of the carrier plate 12 together with the pressing body 5 is carried out by the drive 13 which can move the transparent carrier plate 12 into any position in Z direction. The drive 13 is controlled by means of the storage-and-control unit 8. The translatory movement is very small in accordance with the small press-in depth ET.

Instead of moving the carrier plate 12, it is equally feasible to execute the translatory movement by lifting the holder 1 in Z direction.

A thermal effect of the laser radiation 61 causes the fusing of end faces 23 and of the edge region 33 adjoining the end faces 23. Through heat conduction, the sheet 3 lying on the end faces 23 is also heated and accordingly becomes plastically deformable. This makes it possible to press the sheet 3 into the receptacle opening 20. Because of the small sheet thickness FD, no special expenditure of force is required for pressing in. The press-in depth ET is limited through the storage-and-control unit 8 by the drive 13.

When pressed in, the sheet 3 is drawn taught over the end faces 23 and contacts the edge region 33. In this way, the sheet 3 is welded to the end faces 23 and in the edge region 33 with the inner wall surfaces 24 of the wall structure. The weld seam 28 brought about in this way is therefore always wider than the end face width SB.

In another embodiment, the pressing unit 4 has at least one further, outer pressing body in addition to the pressing body 5 described above, this outer pressing body surrounding the wall structure of the receptacle 2. In conformity to the cup-shaped receptacle from the first embodiment example, the outer pressing body is also annularly shaped, and the outer pressing body is fastened to the carrier plate 12 coaxial to the cylindrical pressing body 5. The outer pressing body has, in addition, an inner diameter which is greater than the dimensioning of the end face 23 of the receptacle 2 by at least twice the sheet thickness FD so that at least one gap 32 corresponding to the sheet thickness FD remains between the outer pressing body and the outer wall surface 25. When the translatory movement is executed, the sheet 3 is also contacted against the outer wall surfaces 25 of the wall structure by the outer pressing body and is welded to the receptacle in the edge region 33 of the outer wall surface 25. The weld seam 28 is accordingly additionally widened around the edge region 33 of the outer wall surface 25.

Figure 2:
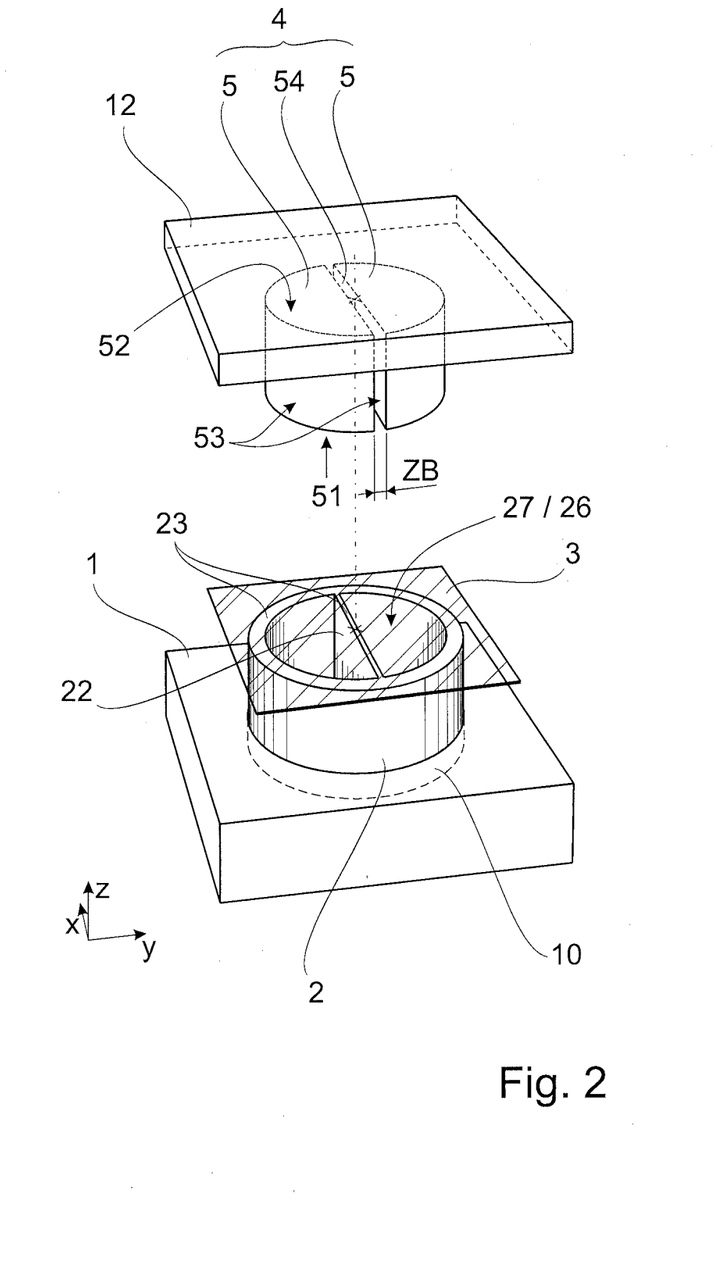
FIG. 2 is a highly schematic representation of a specific embodiment of the apparatus with a pressing unit comprising two pressing bodies.

In a further embodiment example, the pressing unit 4 provided for welding the receptacle opening 20 is formed of two pressing bodies 5. The pressing unit 4 with the two pressing bodies 5 is required when the receptacle opening 20 to be welded also has, in addition to the outer wall 21, a dividing wall 22 which divides the cavity 26 of the receptacle 2 into two chambers 27.

As is illustrated schematically in FIG. 2, the pressing bodies 5 are fastened to the carrier plate 12 adjacently, the terminating surfaces 51 of the pressing bodies 5 facing the holder 1 being arranged in a common plane. An intermediate space 54 arranged in conformity to the wall structures of the receptacle 2 remains between the terminating surfaces 51 of the adjacent pressing bodies 5. The laser radiation 61 can also impinge on the end face 23 of the dividing wall 22 through the intermediate space 54.

The intermediate space width ZB is adapted to the end face width SB of the dividing wall 22. It is greater than the end face width SB by at least twice the sheet thickness FD so that gap 32 is brought about between the two pressing bodies 5 and the inner wall surface 24. The intermediate space 54 is oriented symmetrically with respect to the end face 23 so that gap 32 has exactly the same dimensions on both sides of the dividing wall 22. The laser radiation 61 also reaches the edge region 33 of the inner wall surfaces 24 at the dividing wall 22 through gap 32.

In the pressing unit 4 shown in FIG. 2, the opposing lateral surfaces 53 of the two adjacent pressing bodies 5 are used to homogenize the laser radiation 61. To this end, the pressing bodies 5 have a greater height than is needed for pressing in the sheet 3. Further, the opposing lateral surfaces 53 are constructed as reflectors for the laser radiation 61 and are arranged parallel to one another and perpendicular to the end faces 23. Starting from a determined ratio between the height of the pressing bodies 5 and intermediate space width ZB, which ratio is adapted to a divergence angle of the laser radiation 61, it is possible for the laser radiation 61 entering the intermediate space 54 in a divergent manner to be repeatedly reflected back and forth between the lateral surfaces 53 before impinging on the end face 23 of the dividing wall 22. As a result of the multiple reflection, the laser radiation 61 is blended and accordingly homogeneously distributed over the end face 23. Accordingly, the weld seam 28 is likewise formed very homogeneously so that a greater strength may be achieved. Starting from an intermediate space width ZB adapted to the end face width SB it is also possible, taking into account the divergence angle of the laser radiation 61, to angle the lateral surfaces 53 slightly toward one another so that the intermediate space 54 widens in a funnel shape opposite the radiating direction of the laser radiation 61. As a result of the funnel-shaped shaped spreading, more of the laser radiation 61 can penetrate into the intermediate space 54 and be concentrated on the dividing wall 22. In this way, comparatively less laser power can be used compared to parallel lateral surfaces 53 of the same height. Moreover, angling increases the quantity of multiple reflections so that either the height of the pressing bodies 5 can be reduced with comparable homogenization of the laser radiation 61 or the homogenization can be improved with the height of the pressing bodies 5 remaining the same.

Figure 3:
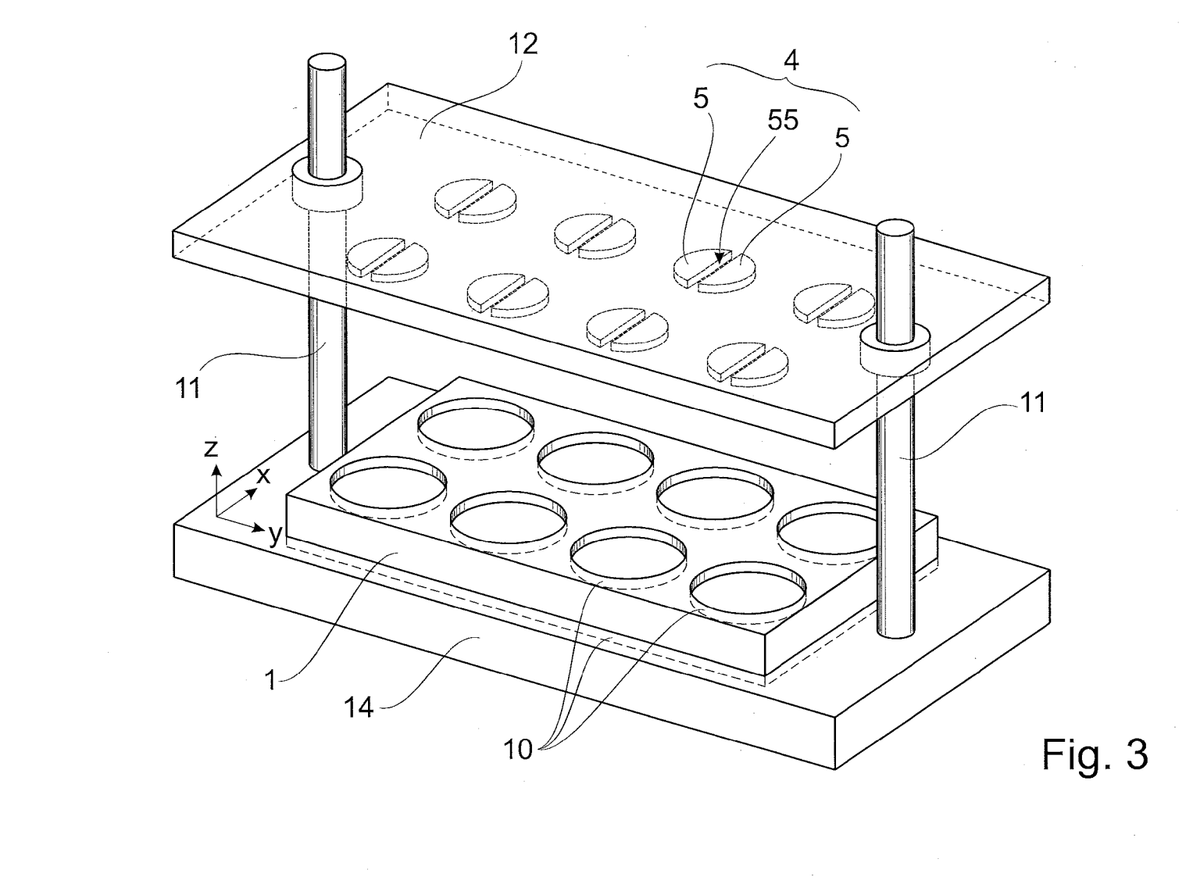
FIG. 3 is a specific embodiment of the apparatus with a plurality of pressing units.

In a further embodiment example, the apparatus is used to weld a plurality of receptacles 2 simultaneously during a relative movement of the laser radiation source 6.

For this purpose, the holder 1 is separated from the rest of the apparatus. As is shown in FIG. 3, the apparatus is expanded by a base plate 14 on which the holder 1 is positioned and fastened to the base plate 14 by a separable connection. The linear guides 11 for the bearing support of the carrier plate 12 are likewise received at the base plate 14. The separable connection facilitates fitting the receptacles 2 to the holder 1 outside of the apparatus. In this way, a structurally identical second holder can be fitted with receptacles 2 already while other receptacles 2 are being welded and can be exchanged with the holder 1 located in the apparatus after the first receptacles 2 have been welded.

The holder 1 is dimensioned correspondingly and has a plurality of positioning means 10. In this way, a plurality of receptacles 2 can be positioned next to one another such that their end faces 23 are in a common plane facing the laser radiation source 6.

The transparent carrier plate 12 is arranged facing the holder 1 which is positioned on the base plate 14, and a quantity of pressing units 4 corresponding to the receptacles 2 that are received is fastened to the transparent carrier plate 12. The pressing units 4 can in turn be formed of one or more pressing bodies 5. The pressing bodies 5 are fastened to the carrier plate 12 exactly opposite the receptacle openings 20 in X direction and Y direction.

Figure 4:
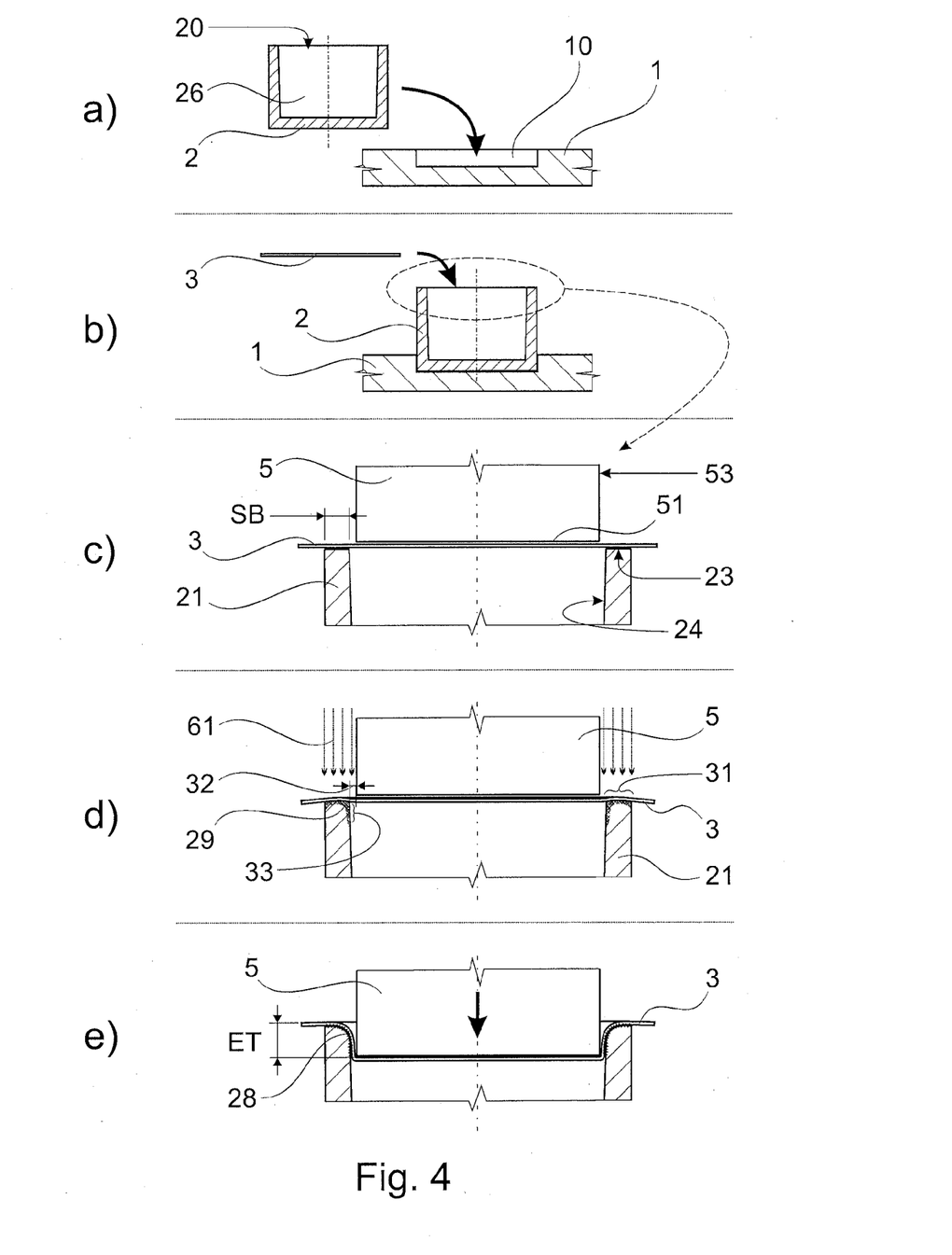
FIG. 4 is a sequence of method steps.

As is shown in FIG. 4, in a method for laser transmission welding of an open receptacle 2 which is to be closed by a sheet 3, the receptacle 2 is positioned in a holder 1 in a first method step a). The receptacle 2 is formed by a wall structure having end faces 23, inner wall surfaces 24 and outer wall surface 25. The wall structure encloses at least one cavity 26 with a cross-sectional area, and the end faces 23 have an end face width SB. At the end faces 23 of the wall structure, the receptacle 2 forms a receptacle opening 20 corresponding to the cross-sectional area. The receptacle 2 is oriented opposite a laser radiation source 6 by means of positioning it in all spatial directions of a Cartesian coordinate system. Laser radiation 61 proceeding from the laser radiation source 6 in Z direction can impinge virtually perpendicularly on the end faces 23 extending in X direction and Y direction.

To close the receptacle opening 20, the sheet 3 is placed directly on the end faces 23 in a method step b) so that the end faces 23 and the receptacle opening 20 are completely covered by the sheet 3. At least at the end faces 23 to be welded, the receptacle 2 comprises a thermoplastic which can absorb the laser radiation 61 proceeding from the laser radiation source 6.

A thin, thermoplastically deformable plastic sheet with a sheet thickness FD is used as sheet 3. At least one plastics component of the sheet 3 is also present in the plastic of the receptacle 2. The sheet 3 is transparent to the laser radiation 61 employed.

Compared to a lid for closing the receptacle 2, the sheet 3 has the advantage that it need not be adapted in a particular way to the receptacle opening 20 with respect either to dimensions or orientation. It is sufficient that it can completely cover the receptacle opening 20 and the end face 23.

In a method step c), a pressing unit 4 is positioned above the cross-sectional area and the sheet 3 placed on the receptacle opening 20. The pressing unit 4 comprises at least one pressing body 5 with a terminating surface 51. The terminating surface 51 is oriented parallel to the end faces 23 and in direct contact with the sheet 3. No pressure is exerted on the sheet 3 by the pressing body 5 when positioning.

The pressing body 5 is formed in X direction and Y direction in conformity to the cross-sectional area of the receptacle opening 20 and fits into the receptacle opening 20 such that a circumferential gap 32 corresponding to the sheet thickness FD remains between the pressing body 5 and the inner wall surfaces 24. In this way, it is possible in a subsequent method step to lower the pressing body 5 in Z direction into the receptacle opening 20.

In the following method step d), the laser radiation 61 impinges on the end faces 23. For this purpose, the laser radiation source 6 is guided over the receptacle opening 20 in a relative movement with respect to the holder 1 executed in Y direction. Because of the two-dimensional extension of the receptacle opening 20, the employed laser radiation source 6 is composed of a plurality of individually controllable, adjacently arranged laser emitters 62 collectively forming a linear array. As a result of the linear array, the receptacle opening 20 is completely spanned by the laser radiation source 6 in X direction. During the relative movement, the individual laser emitters 62 are only triggered when the laser radiation 61 proceeding therefrom can reach the end faces 23. The laser emitters 62 do not operate outside of the end faces 23. This makes the method highly energy-efficient.

The laser radiation 61 absorbed at the end faces 23 heats the absorptive plastic of the receptacle 2 and forms a surface melt 29. Heat emanating from the melt 29 is transferred by heat conduction to the sheet 3 lying directly upon the end faces 23 so that the sheet 3 is softened and forms a thermoplastically deformable region 31.

A portion of the laser radiation 61 impinges on an edge region 33 of the inner wall surfaces 24 through the gap 32 remaining between the pressing body 5 and the wall structure so that the surface melt 29 can also be formed in this edge region 33.

After formation of the melt 29 and the thermoplastically deformable region 31, the pressing body 5 is moved into the receptacle opening 20 in Z direction in the immediately following, final method step e). To this end, the pressing body 5 is lowered with the terminating surface 51 to a press-in depth ET below the end faces 23 which corresponds approximately to the thickness of the wall structures. The sheet 3 can be pressed into the receptacle opening 20 at the same time through the gap 32 so that it is drawn taught over the end faces 23 in the thermoplastically deformable region 31. By lowering the pressing body 5, the sheet 3 also contacts the melt 29 of the edge region 33 of the inner wall surfaces 24. Owing to the fact that the sheet 3 is drawn taught over the melt 29 of the end faces 23 and wall surfaces 24, the sheet 3 firmly contacts the wall structure so that a weld seam 28 fixedly bonding the receptacle 2 and sheet 3 is formed in the region of the melt 29.

When the sheet 3 is pulled tight, the fused end faces 23 and wall surfaces 24 are also plastically deformed. The previously planar end faces 23 are slightly lowered in Z direction and rounded where the end faces 23 and the inner wall surfaces 24 merge. This lowering is advantageously used to compensate for tolerances in the planarity of the end face 23. Accordingly, this method is especially well suited for welding low-viscosity plastics which cannot be welded by the otherwise conventional hot plate welding methods (use of a hot plate as heat source for melting the end face).

Contacting against the inner wall surfaces 24 and rounding both result in an appreciable widening of the weld 28 compared to laser transmission welding carried out exclusively at planar end faces 23. As a result of the method, either a higher strength of the weld 28 can be achieved with comparably thick wall structures or thinner wall structures can be used with a comparable strength of the weld 28.

Further, this lowering also allows very thin wall structures to be welded. With thin-walled wall structures, the laser radiation 61 impinging on the end faces 23 causes a complete melting of the wall structure in the region of the end faces 23. When lowered, the melted wall structure is compressed as well as rounded by the sheet. Accordingly, the end face width SB is increased and there is more volume of the wall structure available for forming the weld seam 28.

In a further embodiment of the method, a plurality of receptacles 2 can also be welded during the relative movement between laser radiation source 6 and holder 1. For this purpose, the receptacles 2 are positioned opposite the laser radiation source 6 with end faces 23 in a plane. Next, a sheet 3 covering all of the receptacle openings 20 of the receptacles 2 positioned in the holder 1 is placed on the end faces 23. A quantity of aligned pressing units 4 likewise lying in a plane, which quantity corresponds to the receptacle openings 20, is then positioned, facing and contacting the sheet 3, parallel to the end faces 23. The pressing units 4 can also comprise a plurality of pressing bodies 5. The laser radiation 61 impinges on the end faces 23 of all of the receptacle openings 20 during a relative movement in Y direction with the laser radiation source 6 which covers all of the receptacle openings 20 in X direction with the laser radiation 61 proceeding from the linear array. During the relative movement, the individual laser emitters 62 of the linear array are only actuated when the laser radiation 61 proceeding therefrom can impinge on an end face 23. The laser radiation 61 absorbed by the end faces 23 results in the formation of a surface melt 29 which also heats the sheet 3 placed thereon through heat conduction. The sheet 3 accordingly becomes thermoplastically deformable in the heated regions so that it can be pressed into the receptacle openings 20 through a movement of all of the pressing units 4. All of the receptacles 2 are accordingly welded simultaneously.

In a further advantageous embodiment, the method is expanded by an additional method step. In this method step, all of the edges of the sheet 3 protruding beyond the end faces 23 of the receptacle openings 20 are cut off flush with the outer wall surfaces 25 of the wall structures. To this end, a cutting device corresponding to the outer dimensions of the end faces 23 and, in case of a plurality of receptacles 2, to the arrangement of the receptacles 2 in the holder 1 is lowered until below the end faces 23 so that the edges of the sheet 3 are sheared off.

Figure 5:
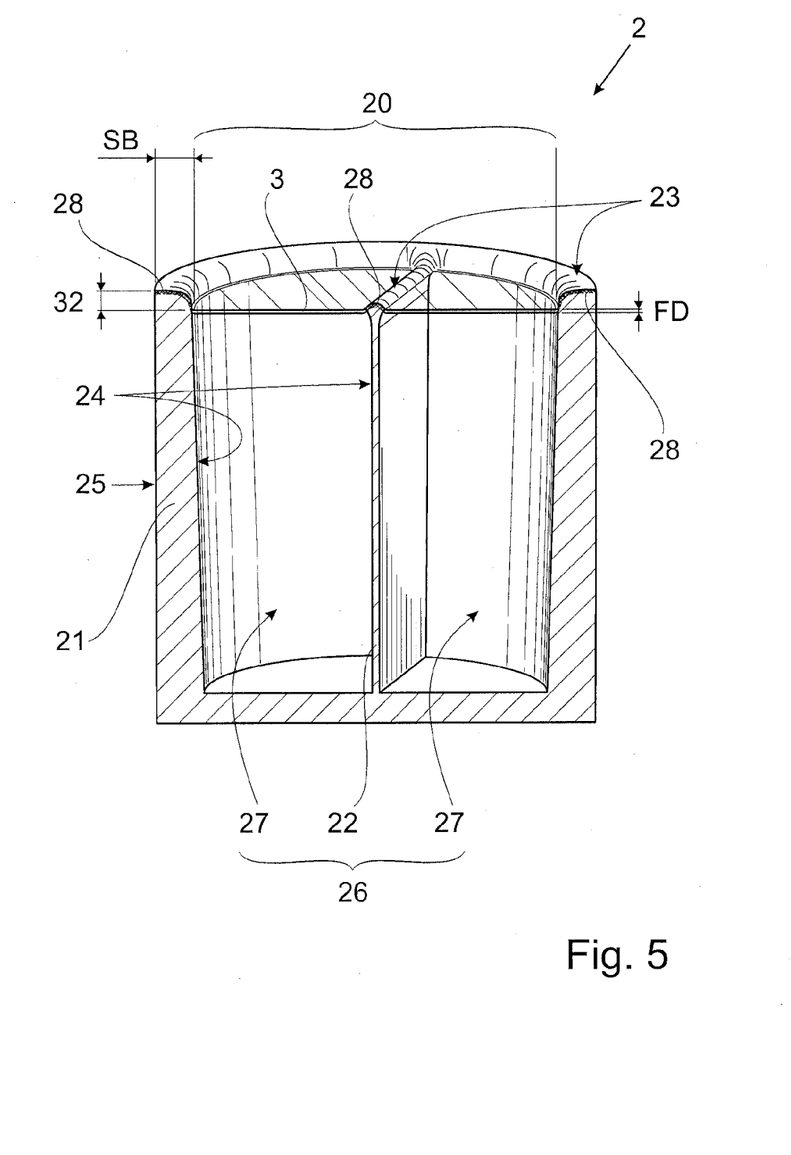
FIG. 5 is a sectional view showing an example of a welded receptacle with very thin dividing walls.

As is shown in FIG. 5, a transmission-welded receptacle 2 according to the invention has a wall structure having end faces 23, inner wall surfaces 24 and outer wall surfaces 25. At least in the region of the end faces 23, the wall structure is made of thermoplastic which is absorptive for a laser radiation 61 used for laser transmission welding. The wall structure encloses at least one cavity 26 with a cross-sectional area and has a stiff outer wall 21 in the wall direction. The cavity 26 can be empty (filled with air for subsequent filling) or may be filled with a gaseous, liquid or solid medium. At the end faces 23 of the outer wall 21, the receptacle 2 forms at least one receptacle opening 20 corresponding to the cross-sectional area at which the cavity 26 of the receptacle 2 is closed by a sheet 3.

A thin, thermoplastically deformable plastic sheet which is transparent at least to the laser radiation 61 used for the laser transmission welding is used as sheet 3. The sheet 3 has at least one plastics component that is also present in the plastic of the receptacle 2.

The sheet 3 is bonded to the receptacle 2 by means of a weld 28. For this purpose, the sheet 3 arranged parallel to the end faces 23 is pressed into the receptacle opening 20 until below the end faces 23 to a press-in depth ET. The press-in depth ET corresponds approximately to the thickness of the wall structure. Rounding is brought about by the pressed in sheet 3 between the end faces 23 and an edge region 33 of the inner wall surfaces 24 which adjoins the end faces 23. The weld seam 28 extends over the end faces 23 having an end face width SB as well as over the edge region 33. The weld seam 28 accordingly has a width which is about three times greater than a receptacle 2 welded exclusively at the end faces 23. A higher strength of the weld 28 can be achieved by the larger weld seam width.

The sheet 3 which is pressed into the cavity 26 of the receptacle 2 within the wall structure is appreciably better protected against external mechanical damage than a sheet 3 which is welded flush with the end face 23.

The material volume of the wall structure in the region of the weld seam 28 is increased by the sheet 3 which is placed on the end faces 23 and tightened over the end faces 23. As a result of this effect and the sheet 3 which is pressed into the receptacle opening 20 in a window-like manner, the receptacle 2 is stiffened in the region of the receptacle opening 20 and the stability over the cross-sectional area of the receptacle 2 is accordingly increased.

The wall structure of the laser transmission-welded receptacle 2 can be formed exclusively by the outer wall 21 which surrounds the cavity 26 of the receptacle 2. In this case, the weld seam 28 at the receptacle opening 20 closed by sheet 3 extends only over the rounded end faces 23 and the edge region 33 of the inner wall surfaces 24 of the outer wall 21.

As is shown in FIG. 5, the laser transmission-welded receptacle 2 can also have additional dividing walls 22 in the cavity 26 in addition to the outer wall 21, which additional dividing walls 22 divide the cavity 26 into individual chambers 27. The end faces 23 of the dividing walls 22 are generally situated in a plane with the end faces 23 of the outer wall 21. The weld seam 28 extends at the dividing walls 22 over the end faces 23 and the two edge regions 33 of the inner wall surfaces 24 of the dividing walls 22.

When the outer wall 21 has sufficient stiffness in wall direction, the dividing walls 22 can also be constructed so as to be substantially thinner than the outer wall 21. In case of very thin dividing walls 22, the end faces 23 of the dividing walls 22 can also be situated between the plane of the end faces 23 of the outer wall 21 and the press-in depth ET of the sheet 3. Lowering the end faces 23 in this way is desirable and is brought about during production of the receptacle 2 in that the very thin dividing walls 22 are compressed by the sheet 3. The volume of the dividing walls 22 in the region of the end faces 23 that is usable for the weld seam 28 is increased by this compression so that the end face width SB is likewise greater. With less material used for the very thin dividing walls 22, the weld seam 28 has a strength comparable to that of a receptacle 2 with thicker dividing walls 22.

A receptacle 2 according to the invention can be used in a particularly advantageous manner as a heat exchanger in which the heat transfer is to take place via the dividing walls 22. In this regard, it is of particular interest to make the dividing walls 22 as thin as possible to ensure optimal heat transfer and to achieve a sufficient compressive strength of the receptacle 2 at the same time. Due to the special construction of the weld seams 28, it is also possible to achieve a high strength between the sheet 3 and the receptacle 2 with very thin dividing walls 22. As was demonstrated in experiments, it was possible to substantially increase the burst strength compared to other receptacles closed exclusively by a connection at the end faces 23.

In a further embodiment of the receptacle 2, the sheet 3 is also connected to the edge region 33 of the outer wall surfaces 25 in addition to the welding in the edge region 33 of the inner wall surfaces 24. For this purpose, the sheet 3 is deep drawn below the end faces 23 also over the edge region 33 of the outer wall surfaces 25 of the outer wall 21, the depth of the deep drawing corresponding approximately to the press-in depth ET. By means of the deep-drawn sheet 3, rounding is also brought about between the end faces 23 and the edge region 33 of the outer wall surfaces 25 which abuts at the end faces 23. The weld seam 28 extends along the edge region 33 of the inner wall surface 24, the end face 23 and the edge region 33 of the outer wall surface 25. This results in a weld seam width that is about four times greater than in the receptacle 2 welded exclusively at the end faces 23, so that the strength of the weld seam 28 is also increased even more.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 holder
10 positioning means
11 linear guide
12 transparent carrier plate
13 drive
14 base plate
2 receptacle
20 receptacle opening
21 outer wall
22 dividing wall
23 end face
24 inner wall surface
25 outer wall surface
26 cavity
27 chamber
28 weld seam
29 melt
3 sheet
31 thermoplastically deformable region
32 gap
33 edge region
4 pressing unit
5 pressing body
51 terminating surface
52 glued surface
53 lateral surface
54 intermediate space
6 laser radiation source
61 laser radiation
62 laser emitter
7 movement device
8 storage-and-control unit
SB end face width
ZB intermediate space width
FD sheet thickness
ET press-in depth
AL radiating length

What is claimed is:

1. A method for laser transmission welding of at least one open receptacle which is to be closed by a sheet and which is formed by a wall structure having an end face and inner and outer wall surfaces, wherein the wall structure encloses at least one cavity with a cross-sectional area, comprising the following steps:

a) positioning the receptacle in a holder, causing said end face of said wall structure to have an end face width equal to the distance between said inner and outer wall surfaces, b) positioning a sheet which covers the end face and cross-sectional area, c) positioning a pressing unit above the sheet, which pressing unit has at least one pressing body with a terminating surface which is smaller than the at least one cross-sectional area by twice the amount of a thickness of said sheet, such that the at least one terminating surface is arranged parallel to the end face and above the at least one cross-sectional area, d) impinging on the end face with a laser radiation to form a melt at the end face which changes the sheet placed thereon to a thermoplastic condition through heat conduction in the region of the melt, e) lowering the pressing unit and, accordingly, the terminating surface of the at least one pressing body to a press-in depth reaching below the end face of the wall structure so that the sheet in thermoplastic condition is drawn taught over the end face by the pressing unit and the sheet also contacts an edge region of the inner and outer wall surfaces which adjoins the end face and the sheet is therefore also welded with the inner wall surfaces at this edge region so that a weld seam width greater than an end face width is brought about.

2. The method according to claim 1, wherein the press-in depth of the pressing unit extends below the end face to the point that the end face are rounded by the contact pressure of the sheet.

* * * * *